United States Patent [19]
Voigt et al.

[11] 3,917,829
[45] Nov. 4, 1975

[54] NOVEL METHODS OF INHIBITING THE ACTIVITY OF TESTOSTERONE 5α-REDUCTASE
[75] Inventors: Walter Voigt; Sung Lan Hsia, both of Miami, Fla.
[73] Assignee: Research Corporation, New York, N.Y.
[22] Filed: Aug. 20, 1973
[21] Appl. No.: 389,741

Related U.S. Application Data
[63] Continuation-in-part of Ser. No. 201,592, Nov. 8, 1971.

[30] Foreign Application Priority Data
Nov. 8, 1972  Canada.............................. 156016

[52] U.S. Cl................................ 424/242; 424/243
[51] Int. Cl.$^2$.......................................... A61K 31/56
[58] Field of Search ......... 424/242, 238; 260/397.4, 260/397.1, 397.7

[56]  References Cited
OTHER PUBLICATIONS
"Steroids" (1969) by Nayfeh et al., Vol. 14, No. 3, pp. 269–283.
J. Biol. Chem. (1973), No. 12, by Voight et al., pp. 4280–4285.

Primary Examiner—Elbert L. Roberts
Attorney, Agent, or Firm—Omri M. Behr

[57]  ABSTRACT

A novel method of inhibiting or arresting the androgenic manifestations of testosterone and other androgens herein disclosed. In this novel method, the conversion of testosterone into its active form, namely 5α-dihydrotestosterone by the action of the enzyme testosterone 5α-reductase is impaired by the introduction into the metabolic system of certain compounds which inhibit the action of the enzyme. The compounds which inhibit the action of this enzyme also inhibit the growth of sebaceous organs.

6 Claims, No Drawings

NOVEL METHODS OF INHIBITING THE ACTIVITY OF TESTOSTERONE 5α-REDUCTASE

RELATED APPLICATIONS

This application is a continuation-in-part of our co-pending application Ser. No. 201,592, filed November 8, 1971, and also claims partial priority from Canadian application Ser. No. 156016, filed November 8, 1972, under licenses No. 362646 dated October 30, 1972 and 362750 dated November 2, 1972.

FIELD OF THE INVENTION

Novel anti-androgenic and anti-seborrheic procedures.

DESCRIPTION OF THE PRIOR ART

It is well known in the hormonal arts that certain undesirable physiological manifestations are caused by an excessive accumulation of testosterone or similar androgenic hormones in the metabolic system, in particular, in the male system. One of these undesirable manifestations is the excessive enlargement of the prostate gland which is fairly common in males of age 60 or over. Compounds which counteract the action of androgens are well known in the art. However, many of these compounds, for example, the estrogens, not only counteract the effect of the androgens but have a feminizing effect as well. This feminizing effect is of course totally undesirable and has held back the treatment of conditions caused by excess androgenic hormones by chemotherapeutic means. Heretofore it has been believed that testosterone, or a metabolite thereof is bound to the prostate gland causing excessive growth thereof. The anti-androgenic compounds known and used heretofore had as their modus operandi the prevention of the binding of the testosterone to the gland, and as to the pituitary.

It has been strongly postulated heretofore, that testosterone is converted by an enzyme in target tissues into 5α-dihydrotestosterone. 5α-dihydrotestosterone is a far more potent androgen than testosterone itself and it is believed that it is this reduced hormone (hereinafter 5α-DHT) which is actually responsible for the dysfunction of the prostate gland. Hence, if a mode could be found to inhibit the conversion of testosterone into 5α-DHT then the dilemma posed by the use of feminizing hormones as anti-androgens might be eliminated.

SUMMARY OF THE INVENTION

The invention described herein was made in the course of work under a grant or award from the Department of Health, Education and Welfare.

We have made the surprising discovery that certain substantially unsubstituted Δ4-3-keto-androstanes substituted by certain β-oriented substituents at $C_{17}$ inhibit the action of testosterone 5α-reductase. More specifically the 17β-substituent should either be an oxygen bonded to a carboxycarbon or have an oxygen attached to the $C_{20}$ carbon. Furthermore, the α-position at $C_{17}$ should be unsubstituted. Fluoro substitution at $C_{16}$-α has also been found helpful.

We advance no theory whatsoever as to the reasons why compounds having these structural characteristics inhibit the action of testosterone 5α-reductase in androgen sensitive organs. We merely note that while compounds having similar structure to this group include progesterone a compound convertible in vivo to androgens and androstenedione which is a known androgen, have testosterone 5α-reductase inhibiting activity, the compounds utilized in the present invention do not possess the undesired androgenic properties of these named compounds, nor the feminizing effect of estrogens. It has further been observed that the foregoing compounds are useful as growth inhibitors of sebaceous organs.

DESCRIPTION OF THE PREFERRED EMBODIMENTS

The Δ4-3-keto androstanes of the present invention which act as testosterone 5α-reductase inhibitors may carry certain 17β-oxy groups or may carry oxygen containing groups at $C_{17}$ having a β-orientation.

These include haloalkanoyloxy groups, for example, fluoroacetoxy, bromoacetoxy or iodoacetoxy, hydroxy alkanoyl substituents such as the hydroxy acetyl groups, and alkanoyl derivatives thereof suitably acetoxy alkanoyl groups such as acetoxy acetyl, and most desirable of all, is the carboxylic acid group. It has further been found that the activity of certain of these active compounds may be further enhanced by the substitution of a 16-α fluoro atom.

The preferred compounds of the present invention may be structurally represented as follows:

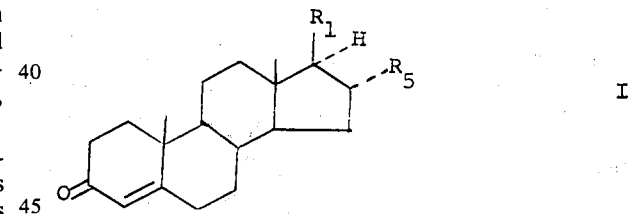

wherein $R_1$ is selected from the group consisting of —COOH, —COOR$_2$,

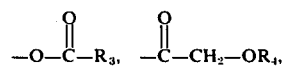

where $R_2$ is alkyl, or phenyl alkyl, $OR_3$ is haloalkyl, suitably chloromethyl or iodomethyl, and $R_4$ is hydroxy or alkanoyloxy, suitably acetoxy. In the foregoing definition, the "alk" moiety is preferably lower "alk", suitably having 1–5 carbon atoms. $R_5$ is hydrogen or fluorine.

In contrast to the foregoing it should be noted the inhibition of testosterone 5α-reductase in androgen sensitive organs such as the prostate gland, the seminal vesicles, and the sebaceous glands is decreased when a substituent is present at 17-α and is substantially decreased when no oxygen is present in the $C_{17}$-β substituent in the manner mentioned hereinabove. The presence of an oxygen function at $C_{11}$ and the removal of the $C_{19}$ methyl group as in the case of 19-Nortestosterone, also decrease the inhibitory effect.

While we do not wish to be bound by the theory, it would appear that the factors which inhibit the action of testosterone 5α-reductase do so by competition for the 5α-reductase with testosterone. The foregoing finding makes it possible to effect physiological administration to mammals requiring the same. Steroids falling within the aforementioned category of inhibiting testosterone 5α-reductase activity do so without exhibiting undesirable side-effects.

The compounds may be administered in the usual manner to mammals namely, orally, parenterally, or intramuscularly. They may be formulated as tablets, powders, or capsules, with the carriers and solid diluents known to the art, or they may be diluted with liquid diluents for injection purposes such as saline, sesame oil or the like.

It will be understood by those skilled in the art that the dosage amount and dosage frequency will depend upon the nature of the condition to be corrected. However, with that proviso, it may be stated that there may be administered from about 0.5 to about 5, suitably from about 1 to about 3 mg/kg. of the inhibiting steroid per dose and there may be administered from about 1 to about 10 suitably from about 2 to about 6 mg/kg per day for from about 20 to about 40 days of the inhibitor. While previous studies have shown the 5α-reduction of progesterone by slices of human skin it has not heretofore been found that a relationship exists between the 5α-reductase activity directed to progesterone and the 5α-reductase activity directed to testosterone.

The compounds having the surprising 5α-reductase inhibiting activity disclosed herein are, with the exception of the esters whose method of synthesis is disclosed herein below, old compounds which are well known in the art or which may be produced by those skilled in the art by methods which are well known to them.

It has further been noted that administration of these compounds suppresses the growth of sebaceous organs in mammals. For this purpose it is preferred to administer these compounds topically. They may be formulated as lotions, salves, creams or tinctures with the carriers and diluents known to the art.

Dosage amounts and dosage frequency will, it will be understood by those skilled in the art be varied in accordance with the nature of the condition to be corrected. Nevertheless, there may be administered dosages of the order of 100 µg to 1000 µg/ sq.cm/day suitably about 200–400 µg/ sq.cm/day in dilutions of from about 1 mg. to about 20 mg./ml. of diluent. The invention should not however be considered as limited by these ranges.

EXPERIMENTAL

Steroids - Testosterone -4-$^{14}$C (specific activity 58.8 µCi per µmole) was purchased from New England Nuclear. They showed only single peaks of radioactivity in our chromatography systems and were used without further purification.

EXAMPLE 1

Homogenization of Foreskin Samples — Foreskin specimens were obtained at circumcision of the newborn, and were either used immediately or stored at −15°C. Specimens stored up to several months were found to suffer no loss of the testosterone 5α-reductase activity. Approximately 1 g of tissue was first finely chopped with scissors and then homogenized in 10 volumes of a medium containing 0.1 M phosphate and 0.2 M sucrose, pH 7.5, with a Polytron (Kinematica, Lucerne, Switzerland), until there were no more visible pieces of intact skin. This usually took less than 5 min. Bundles of collagen fibers which resisted homogenization were removed with tweezers. The homogenate was then transferred into a Ten Broeck homogenizer fitted with a 1/3 horsepower motor operated at 1000 rpm and further ground by 15 strokes of the pestle. The collagenous material was removed by filtration through glasswool, and the filtrate was centrifuged at 800 × $g$ for 10 min. The precipitate was washed three times with the homogenizing solution and the pellet contained nuclei as the major component. Fractions designated mitochondrial and microsomal were obtained following centrifugation at 10,000 × $g$ for 10 min and 105,000 × $g$ for 1 hour, respectively. They were resuspended in the homogenizing solution (mitochondrial pellet from 1 g of skin in 4 ml and microsomal pellet from 1 g of skin in 1 ml). All operations were carried out at 0°–4°.

EXAMPLE II

Assay of Enzymatic Activity — Unless otherwise indicated, skin fractions were incubated with testosterone-4-$^{14}$C (10$^5$ dpm) dissolved in 20 µl of ethanol and added to an incubation medium containing 5 µmoles of glucose 6-phosphate, 0.2 µmole of NADP, and 0.2 unit of glucose 6-phosphate dehydrogenase (one unit of glucose 6-phosphate dehydrogenase is the amount of enzyme that reduces 1 µmole of NADP in 1 min at pH 7.4, 25° in the presence of glucose 6-phosphate) in a total volume of ml of 0.1 M citratephosphate buffer, pH 5.6. Incubations were carried out for 10 min at 37° in a Dubnoff metabolic incubator.

The reaction was terminated by immersing the incubation flask in a Dry Ice-acetone bath followed by lyophilization. Carrier steroids (50 µg each of testosterone, 5α-dihydrotestosterone, and androstanediol) were added and the mixture was extracted with methanol. The extract was concentrated under nitrogen, and the residue was applied to thin layer plates and chromatographed in a system of chloroform-methanol (98.25:–1.75) as described previously. The carrier steroids were visualized by exposure to iodine vapor, and the radioactivity was detected with a Vanguard Autoscanner 880. The radioactive spot corresponding to 5α-dihydrotestosterone were then scraped off the plates and radioassayed in a Packard Tri-Carb scintillation counter. The scintillation fluid used was a mixture of 5 g of 2,5-diphenyloxazole (PPO), 300 mg of dimethyl 1,4-bis[2-(5-phenyloxazolyl)] benzene (POPOP) (Packard), 80 g of naphthalene, 240 ml of ethyl alcohol, 400 ml of dioxane, and 400 ml of toluene. The amounts of 5α-dihydrotestosterone produced was calculated from the $^{14}$C in this fraction and the specific activity of the steroid (same as testosterone-4-$^{14}$C). The testosterone 5α-reductase activity was calculated from the sum of the two 5α-steroids.

EXAMPLE III

Inhibitory effect of various steroids on 5α-reduction of testosterone

Aliquots of a microsomal suspension (10 mg of protein) were incubated with testosterone-4-$^{14}$C (10$^5$ dpm, 0.77 mµmole) in the presence of the various nonradioactive steroids at a final concentration of 10$^{-5}$ M. Incubation conditions are described under Example II.

| Additions | Inhibition |
|---|---|
| | % |
| None | 0 |
| 4-Androsten-3$\beta$,17$\beta$-diol | 4.3 |
| 4-Androstein-11$\beta$-ol,3,17-dione | 22.9 |
| 4-Androstene-3,11,17-trione | 7.6 |
| Androstenedione | 76.4 |
| Androsterone | 0 |
| 5$\beta$-Androsterone | 3.6 |
| Corticosterone | 23.7 |
| Cortisol | 2.8 |
| Cortisone | 5.4 |
| Dehydroepiandrosterone | 1.9 |
| 5$\alpha$-Dihydrotestosterone | 4.5 |
| Deoxycorticosterone | 84.7 |
| Deoxycorticosterone acetate | 85.8 |
| Epitestosterone | 23.5 |
| Estradiol | 2.8 |
| Estrone | 7.5 |
| 17$\alpha$-Hydroxyprogesterone | 54.0 |
| 17$\alpha$-Methyl-B-nortestosterone | 0.8 |
| 19-Nortestosterone | 55.4 |
| 4-Pregnen-20$\beta$-ol-3-one | 54.1 |
| Pregnenolone | 3.3 |
| Progesterone | 93.3 |
| Testoloactone | 2.8 |
| 3-oxo-androst-4-ene 17$\beta$ carboxylic acid | 80 |
| 17$\beta$-hydroxy-17$\alpha$-methyl-3-oxo-androst-4-ene | 35.2 |
| 16$\alpha$-fluoro-17$\alpha$-hydroxy-3-oxo-androst-4-ene | 49 |
| | 12.4 |
| 3-oxo-17$\beta$-vinyl-androst-4-ene | |
| Testosterone 17$\beta$-chloroacetate | 62.5 |
| Testosterone 17$\beta$-7 iodo acetate | 57.1 |

EXAMPLE IV

Synthesis of Testosterone 17$\beta$-Chloroacetate 300 mg of testosterone were dissolved in 60 ml of ice-cold acetone containing 0.6 ml of pyridine. 3.6 g of chloroacetic anhydride in 5 ml of acetone were added drop-wise over a period of 30 min. The mixture was kept overnight at 4°C and reduced to 20 ml volume under $N_2$. It was then added to 400 ml of ice-water. The precipitate was collected, washed, and crystallized from acetone and water. We obtained 352 mg of product.

Identification:
m.p. of testosterone = 153° – 158°
m.p. of product = 125°
mixed m.p. = 115°

IR spectrum run on testosterone and the expected chloroacetate of testosterone gave an ester peak at 1710 cm$^{-1}$ only on the chloroacetate.

EXAMPLE V

Synthesis of Testosterone 17$\beta$-Iodoacetate 229 mg of testosterone 17$\beta$-chloroacetate were refluxed with 320 mg of KI in 30 ml acetone for 4 hours. After the reaction, the volume was reduced to 5 ml. with $N_2$ and the mixture added to 25 ml. of an ice-cold 5% solution of $Na_2S_2O_3$ in water. The precipitate obtained was recrystallized from acetone and water. Yield — 254 mg. Identification: m.p. of product = 138°. IR spectrum of the product showed also an ester peak at 1710 cm$^{-1}$. The rest of the spectrum had some features different than the spectrum of the testosterone-chloroacetate.

In accordance with the foregoing procedure, but using potassium bromide in place of potassium iodide, there is obtained testosterone 17$\beta$-bromoacetate.

EXAMPLE VI

The effect of certain compounds on a sebaceous gland (female hamster flank organ) was tested by a modification of the method of Frost and Gomes (Advances in Biology of Skin. p.403, 12, Ed. Montagna et al., Appleton-Century-Crofts, New York, New York, 1969).

Materials and Methods

Steroids

Testosterone propionate was obtained from Mann Research: 4-Androstene-3-one-17$\beta$-carboxylic acid.

The methyl ester of 4-androstene-3-one-17$\beta$-carboxylic acid was prepared by methylation of the acid in methanol containing HCl. To a solution of 300 mg of 4-androstene-3-one-17$\beta$-carboxylic acid (m.p. 245°C) in 30 ml. of methanol were added 5 ml. of concentrated HCl. The mixture was kept warm in a water bath at 40°C for 15 min. and then left at room temperature overnight. Methyl 4-androstene-3-one-17$\beta$-carboxylate, 230 mg. was obtained after precipitation with the addition of water and recrystallization from acetone and water, m.p. 131°C.

THE FLANK ORGAN TEST

Female Syrian golden hamsters, ten weeks old, were obtained from Engle's Laboratory (Farmersburg, Indiana), and fed Purina Rat Chow ad libitum. At the beginning of treatment and every three days thereafter, the animals were closely shaven with an electric hair clipper to expose the flank organ and adjacent skin for visual observation. The animals were separated into three groups of 5 animals each and treated with the various steroids as follows. Group I received testosterone propionate (4 $\mu$g.); Group II, testosterone propionate (4 $\mu$g.) plus 4-androstene-3-one-17$\beta$-carboxylic acid (400 $\mu$g.); Group III, testosterone propionate (4 $\mu$g.) plus methyl 4-androstene-3-one-17$\beta$-carboxylate (400 $\mu$g.). The steroid solution, in 60 $\mu$l of acetone, was applied topically to one of the flank organs of each animal, while 60 $\mu$l of acetone was applied to the contralateral organ which was used as the control. A small pipette was used to deliver the solution or acetone, and case was taken that the applied material did not run from the area of the flank organ. One application was made daily (except Saturdays and Sundays) for three weeks. Exposed skin area ca. 2 cm$^2$.

For histological studies, the organs were excised at the end of treatment, cut in half and fixed in Carnoys fixative. Paraffin sections were cut through the center of the organ and stained in hematoxylin and eosin.

In animals of Group I, following three weeks of applications of testosterone propionate to one of the two organs, the treated organ increased in size to resemble a male organ. The contralateral organ, however, remained small, indicating that the steroid at the dose used exerted only local effect. This result is shown. In animals of Group II treated concomitantly with testosterone propionate and 4-androstene-3-one-17$\beta$-carboxylic acid, the stimulatory effect of testosterone propionate was completely blocked, and at the end of three weeks, the treated organ showed no increase in size or pigmentation, and was indistinguishable from the contralateral control organ.

In Group III, it was found that methyl 4-androstene-3-one-17$\beta$-carboxylate was equally inhibitory of the effects of testosterone propionate as 4-androstene-3-one-17$\beta$-carboxylic acid.

Histological sections through the center of the flank organ also reveal the inhibitory properties of 4-androstene-3-one-17$\beta$-carboxylic acid. In a section of the flank organ of a female hamster stimulated with testosterone propionate (Group I), enlarged sebaceous glands are noted which form an almost continuous mass from follicle to follicle. A section through the organ of an animal treated with testosterone propionate plus 4-androstene-3-one-17β-carboxylic acid (Group II) revealed small and widely separated sebaceous glands.

At greater magnification a majority of the individual sebaceous cells in the stimulated organ exhibited a cytoplasm replete with lipid droplets. In contrast, in the 4-androstene-3-one-17β-carboxylic acid treated flank organ, the cells of the sebaceous glands contained much less cytoplasmic lipids. This observation suggests that the inhibitory effect of 4-androstene-3-one-17β-carboxylic acid on sebaceous glands is not only with respect to the total number of sebaceous cells, but on their lipid content as well.

EXAMPLE VII

Androst-4-ene-3-one-17β-carboxylic acid (referred to as AEOC) was further tested for its capacity to reduce the prostate gland and the seminal vesicles of rats.

For this test, Sprague-Dawley rats, 4 weeks old, were castrated and divided into various groups of seven rats each. Starting the day following castration, treatment began in the manner described in Table II. The daily injections of either testosterone propionate, AEOC, were administered subcutaneously with sesame oil as vehicle, and lasted for seven days. One day after the last injection, the rats were killed and the ventral prostate and seminal visicles were excised and weighed.

It can be seen from the results that AEOC exerts an inhibitory effect on the growth of both the prostate and the seminal vesicles of rats.

TABLE II

| Group | Dose mg/rat/day | | Mean Organ Weight mg. | | Gain Body Weight g. |
|---|---|---|---|---|---|
| | T.P. | AEOC | V.P. | S.V. | |
| F | 0 | 0 | 24 | 31 | 46.7 |
| A | 0.08 | 0 | 96 | 133 | 57.4 |
| D | 0.08 | 8.0 | 52 | 74 | 43.1 |
| C | 0.08 | 4.0 | 44 | 92 | 41.4 |
| B | 0.08 | 0.8 | 45 | 90 | 55.0 |
| E | 0 | 8.0 | 8 | 16 | 41.9 |
| Intact Animals | | | | | |
| X | 0 | 0 | 50 | 43 | 49.2 |

Abbreviations:
V.P.: ventral prostate
S.V.: seminal vesicles
T.P.: testosterone propionate
AEOC: androst-4-ene-3-one-17β-carboxylic acid

We claim:

1. A method of inhibiting the activity of testosterone 5-reductase in androgen sensitive organs of the group consisting of the prostate glands, the sebaceous glands and the seminal vesicals by administering to a mammal in need of such inhibition, between 1 and 10 mg/Kg/day of a compound of the formula:

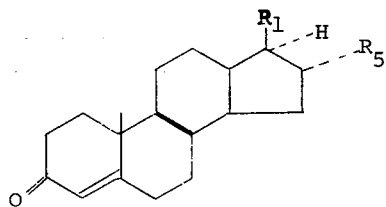

wherein —$R_1$ is selected from the group consisting of —COOH, —COOR$_2$,

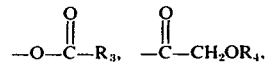

wherein $R_2$ is alkyl or phenyl alkyl, $R_3$ is haloalkyl, OR$_4$ is hydroxy or alkanoyloxy, and $R_5$ is hydrogen or fluoro, wherein "alk" signifies 1–5 carbon atoms.

2. A method of claim 1 wherein in the compound of Formula I, $R_1$ is —COOH.

3. A method of claim 2 wherein in the compound of Formula I is $R_1$ is COOH or COOR$_2$.

4. A method of claim 1 wherein the compound of Formula I $R_1$ is

and OR$_4$ is hydroxy or alkoxy.

5. A method of claim 2 wherein the compound of Formula I $R_1$ is

and OR$_4$ is hydroxy or alkoxy.

6. A method of suppressing the growth of sebaceous organs in mammals which comprises administering thereto between 100 and 1000 μg/sq. cm/day of:

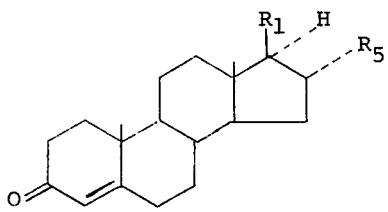

wherein —$R_1$ is selected from the group consisting of —COOH, —COOR$_2$,

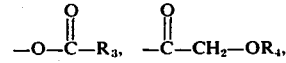

wherein $R_2$ is alkyl or phenyl alkyl, $R_3$ is alkyl or haloalkyl, OR$_4$ is hydroxy or alkanoyloxy, and $R_5$ is hydrogen or fluoro, wherein "alk" signifies 1–5 carbon atoms.

* * * * *